Aug. 31, 1965 W. J. GOODWIN 3,204,109
PHOTOSENSITIVE ASSEMBLY FOR WEB POSITIONING SYSTEM
Filed Oct. 24, 1961 3 Sheets-Sheet 1

INVENTOR.
WINCHEL J. GOODWIN
BY
ATTORNEYS.

Aug. 31, 1965 W. J. GOODWIN 3,204,109
PHOTOSENSITIVE ASSEMBLY FOR WEB POSITIONING SYSTEM
Filed Oct. 24, 1961 3 Sheets-Sheet 2
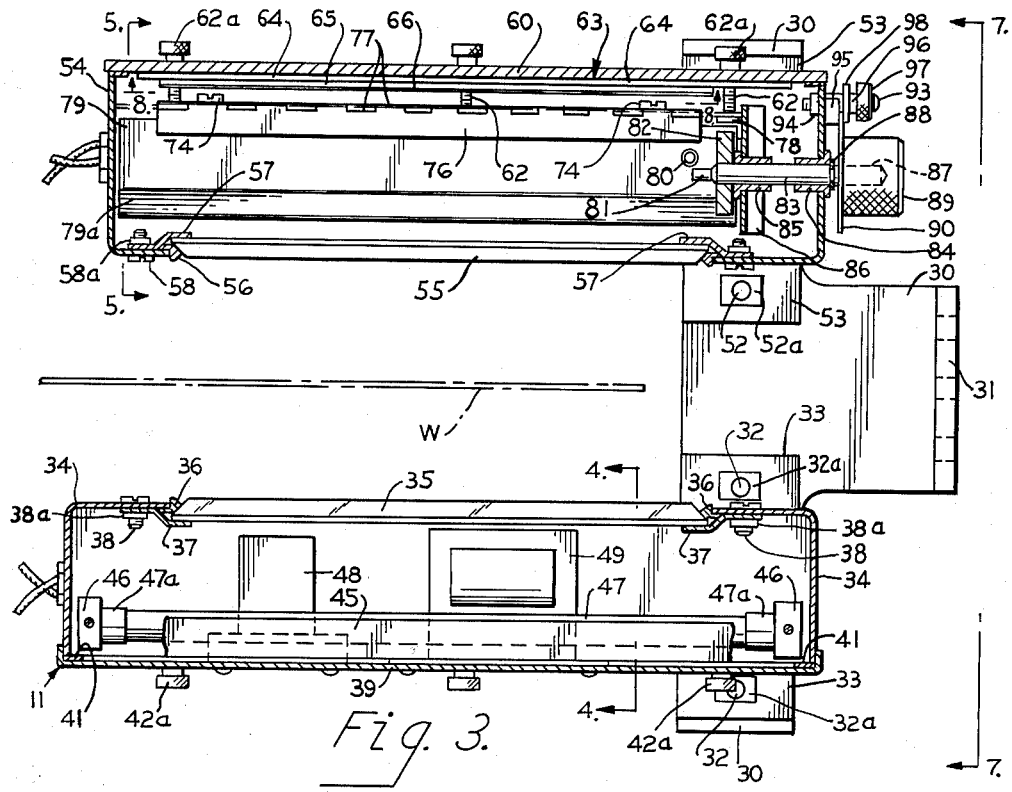
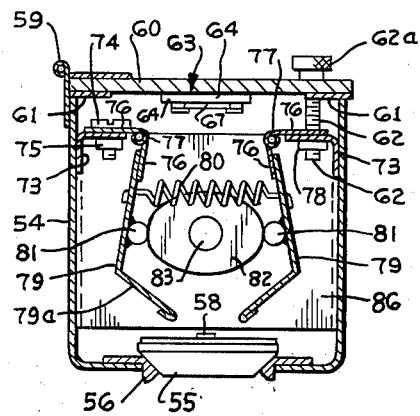
Fig. 6.
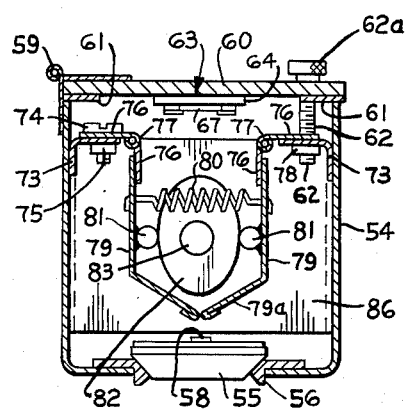
Fig. 5.
INVENTOR.
WINCHEL J. GOODWIN
BY
ATTORNEYS.

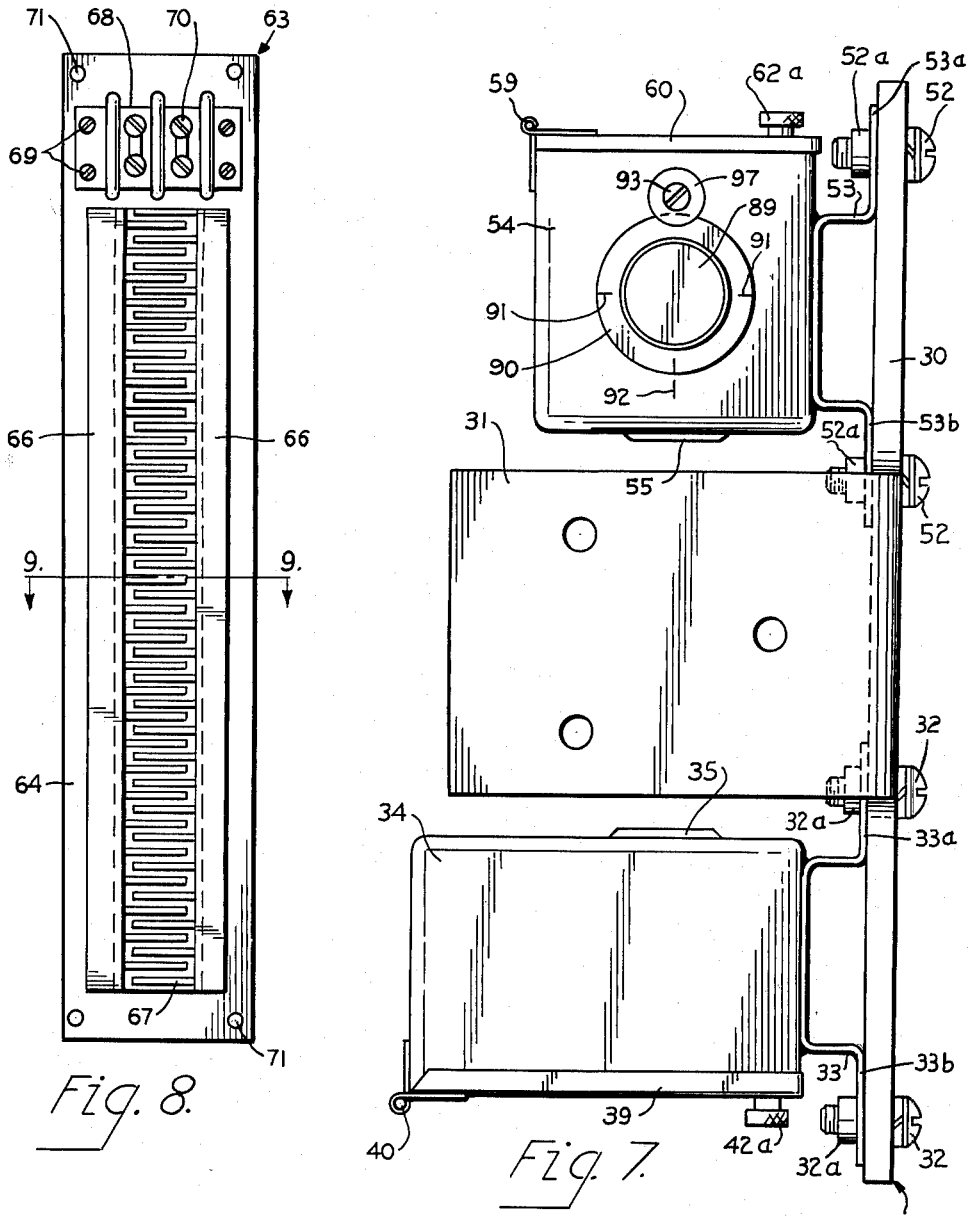

United States Patent Office 3,204,109
Patented Aug. 31, 1965

3,204,109
PHOTOSENSITIVE ASSEMBLY FOR WEB
POSITIONING SYSTEM
Winchel J. Goodwin, Akron, Ohio, assignor, by mesne
assignments, to The Akron Standard Mold Company,
Akron, Ohio, a corporation of Ohio
Filed Oct. 24, 1961, Ser. No. 147,346
4 Claims. (Cl. 250—239)

This invention, which has to do with an improvement in the web guide of the prior application of Robert F. Snyder, filed August 14, 1961, as Serial No. 131,345, now Patent No. 3,096,919, relates to a novel form of photosensitive sensor assembly for a web-positioning system.

Prior types of photo-responsive sensor assemblies for web-positioning systems have generally been somewhat inaccurate and, if not, have been so designed in the interests of accuracy as to make them awkward, cumbersome and wasteful of space in the primary installation, where space is usually at a premium. In general, they have not had nor has it been feasible to provide them with conveniently accessible means for controlling the amount of light impinging on the detector element, which is desirable in order to achieve maximum efficiency of the sensor assembly under prevailing conditions. The present invention, which seeks to overcome these objections, has as its principal objects to provide sensor assemblies that are at once sensitive, accurate, susceptible of adjustment, and capable of being accommodated in compact form in housings requiring a minimum of space in the primary installation, whether the latter be a calender, web drier, fabric-stretching stand or other generally similar apparatus.

Other objects, advantages and features of the invention will be apparent from the description which follows and from the accompanying drawings, in which:

FIGURE 3 is a side elevation, with parts broken away, through one of the sensor assemblies appearing in FIGURE 1.

FIGURE 5 is a similar section on line 5—5 of FIGURE 3.

FIGURE 6 is a similar section, likewise on line 5—5 of FIGURE 3, showing the shutter in open position.

FIGURE 7 is an end elevation on an enlarged scale of the sensor assembly of FIGURE 3 as seen from line 7—7 thereof.

FIGURE 8 is an enlarged bottom plan of the detector assembly as seen from line 8—8 of FIGURE 3.

FIGURE 9 is a cross-section on a still larger scale on line 9—9 of FIGURE 8.

Figure 1:
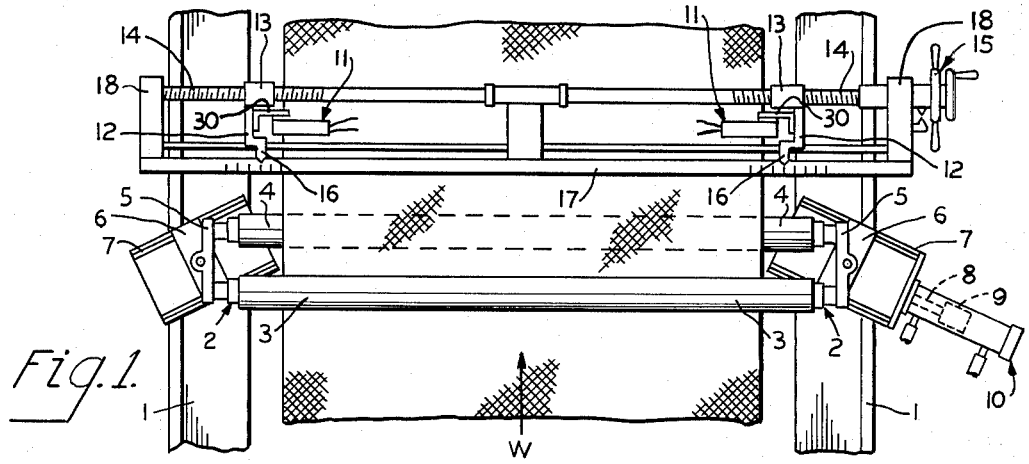
FIGURE 1 is a plan on a reduced scale of a photoresponsive web-positioning system within the purview of the invention.

The web-positioning system of the invention calls for the use of one or more sensor assemblies, means for mounting them in apposition to the web on suitable supporting structure, and web-positioning means likewise mounted on appropriately located supporting structure. In FIGURE 1, supporting structure 1 takes the form of structural elements which are shown as extending horizontally but which, if desired, might equally well extend vertically. Shown as superimposed on supporting structure 1 is a horizontally oriented web-positioning device indicated generally at 2. Among other things, it consists of an idle roller 3 that overlies web W, an idle roller 4 that underlies the web, and two crossheads 5 connecting them at their ends. Crossheads 5 are pivotally supported on slides 6 that are carried by but free to move lengthwise of ways 7, of which there is a pair on each side of the supporting structure, seen as in FIGURE 1. Slide 6 at the right-hand end of the figure is actuable by a piston rod 8 and piston 9 (shown in dotted lines) in a power cylinder 10 operated by a pressure fluid.

Sensor assemblies 11, of which there need be only one if the web-positioning device is to be used only for edge alignment but of which there should be two if, as in the illustrated embodiment of the invention, it is to be used for web centering, appear near the left-hand and right-hand ends of FIGURE 1. They are shown therein as mounted on movable supports 12 that are welded to travelling nuts 13 carried by oppositely threaded portions of a rotatable shaft 14. Coupled to shaft 14 at the right-hand end thereof, seen in FIGURE 1, is a hand wheel assembly 15 for rotating the shaft and thereby moving nuts 13, supports 12 and sensor assemblies 11 toward or from each other. Position indicators 16 forming part of supports 12 are adapted to cooperate with suitable scale markings inscribed in an indicator bar 17 that parallels shaft 14. Like the latter, indicator bar 17 is supported from opposite sides of supporting structure 1 by means of end pieces 18.

With the exception of sensor assemblies 11, which will be described in detail below, the components so far mentioned are largely conventional. Also conventional, except for sensor assemblies 11, is the circuit shown diagrammatically in FIGURE 2. Leads 20 connected to mains of suitable electrical characteristics supply current by means of paired wires 21 and paired wires 22 to light sources forming part of the sensor assemblies. Leads 20 are connected also to step-down transofrmer 23 coupled to an electrical bridge 24. One side of the latter is connected by a wire 25 to suitable electrical controls (not shown) for the fluid pressure system used to operate power cylinder 10. The other side of the bridge is connected by a wire 26 to the detector elements forming part of the sensor assemblies which elements are themselves connected by a wire 27 to the controls for the power cylinder.

Figure 2:
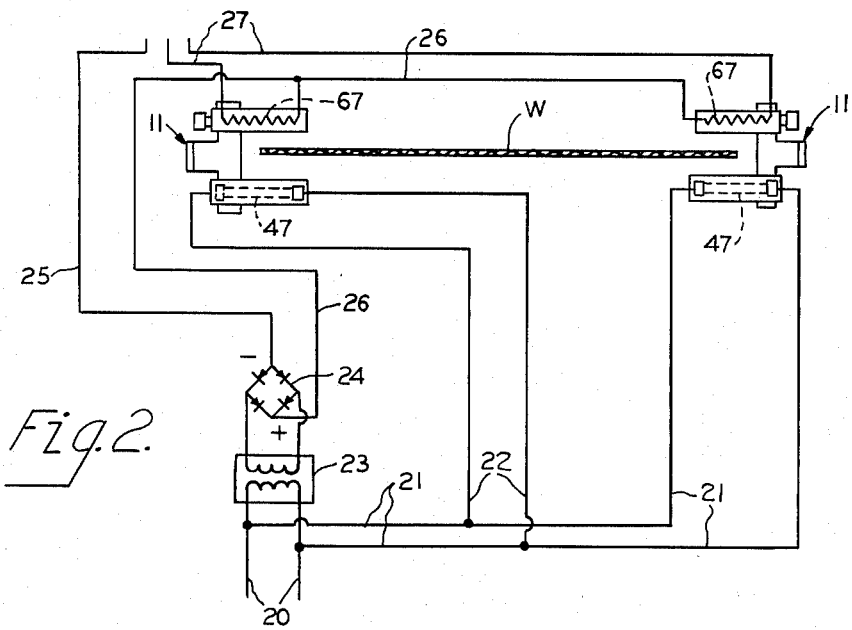
FIGURE 2 is a diagrammatic representation of a portion of the electrical circuit.

In FIGURES 1 and 2, sensor assemblies 11 are shown diagrammatically. The details of their construction appear in FIGURES 3 to 6, from which it will be evident that a typical sensor assembly, in this case the one shown at the right-hand end of FIGURE 1, includes a generally T-shaped metal supporting element 30 (FIGURE 3) provided with a mounting flange 31 (FIGURE 7) by which the sensor assembly is mounted on support 12 (FIGURE 1). The screws 32 and nuts 32a at the lower end of T-shaped supporting element 30 are used to clamp in place the oppositely directed flanges 33a and 33b on the sides of the U-shaped metal bracket 33 seen in FIGURE 7. An elongated metal housing 34 containing the light source for the sensor assembly, hereinafter referred to as the lower housing, is welded at one end to the face of bracket 33, see FIGURES 3 and 7.

Figure 4:
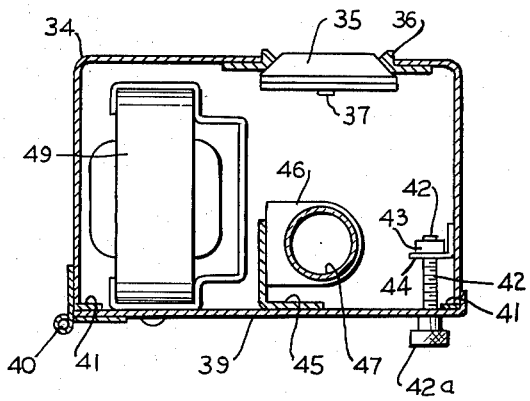
FIGURE 4 is a section on an enlarged scale on line 4—4 of FIGURE 3.

As appears from FIGURES 3 and 4, the top of lower housing 34 is equipped with an elongated window 35 of transparent plastic or glass. Window 35 is framed by sealing strips 36, against which it is urged by end clips 37 that are themselves held in place by screws 38 and nuts 38a (FIGURE 3). Lower housing 34 is provided with a bottom lid 39 carried by a piano hinge 40 that extends lengthwise of the housing along one edge of what would otherwise be the open bottom thereof. Dust strips 41 intervene between bottom lid 39 and the bottom of the housing.

Lid 39 can be held in closed position by a series of three locking screws 42 with knurled heads 42a which screws are adapted to engage tapped weld nuts 43 attached to a longitudinally extending angle iron 44 welded to the inside face of one of the side walls of lower housing 34. Welded, brazed or riveted to the upper face of bottom lid 39 is a longitudinally extending angle 45 on which, by means of mounting brackets 46, is supported a fluorescent lamp tube 47. The effective length of the latter is slightly greater than the overall length of window 35, which overlies it as shown in FIGURE 4. Elsewhere on the upper face of bottom lid 39 are the starter 48 and ballast 49 for the fluorescent lamp tube.

At the upper end of T-shaped supporting element 30, directly above screws 32 and nuts 32a, are similar screws 52 and nuts 52a, likewise seen in FIGURE 7. By means thereof the oppositely directed side flanges 53a and 53b on a second U-shaped metal bracket 53 are attached to the supporting element. Welded at one end to the face of bracket 53 is an elongated upper housing 54 which resembles but is reversed in relation to and in general is of smaller dimensions than lower housing 34. At its bottom it is provided with a transparent plastic or glass window 55 which is urged against sealing strips 56 by means of end clips 57 that are themselves held in place by screws 58 and nuts 58a. Window 55 in the bottom of upper housing 54 is in substantial registry with window 35 in the top of lower housing 34, which it resembles in size and shape.

A piano hinge 59 extends lengthwise of one of the top edges of upper housing 54, see FIGURES 5 to 7. One of the leaves of this hinge carries a lid 60 that serves as the closure for the opening in the housing. Dust strips 61 seen in cross section in FIGURES 5 and 6, intervene between the lid and the housing. A series of three screws 62 provided with knurled heads 62a serve to lock lid 60 in place at the top of upper housing 54 much as lid 39 is locked in place at the bottom of lower housing 34.

Carried by the lower face of lid 60 is the light-sensitive detector assembly 63, see FIGURES 3, 5 and 6. As further appears from FIGURES 8 and 9, it incorporates an elongated base 64, which may be of aluminum or other suitable material. To the lower face of base 64 are glued two narrow strips 65 of a suitable electrical insulating material, one on each side; underlying the latter are two slightly wider brass strips 66 that project toward each other as indicated in FIGURE 9. Held in place by the strips 65 and 66 and intervening layers, not shown, of conductive silver cement (dispersed silver particles in an appropriate medium) is a long, narrow ribbon-like photoconductive element 67. Although the body of the latter is of glass, its exposed face consists of a thin layer of gold with a superimposed grid made up of alternating fingers of sensitized cadmium sulphide arranged as shown in FIGURE 8.

At one end of detector assembly 63 is a terminal base 68 of electrical insulating material held in place by screws 69. The wires that connect the cadmium sulphide fingers and incorporate detector assembly 63 in the electrical circuit shown in FIGURE 2 are attached to binding posts 70 mounted on terminal base 69. The detector assembly as a whole is attached to the lower face of lid 60 by rivets or screws passing through holes 71. Detector assembly 63 is in registry with window 55 in upper housing 54 and window 35 and light source 47 in lower housing 34. Thus in the absence of intervening barriers light from fluorescent light tube 47 can impinge on photoconductive element 67.

In order to control the amount of light impinging on detector assembly 63, upper housing 54 is further provided with a shutter the details of which are shown in FIGURES 5 and 6. On the inside face of one of the two side walls of upper housing 54, at the left in FIGURES 5 and 6, is a longitudinally extending angle 73 which, with the assistance of a series of screws 74 and weld nuts 75, acts to clamp in place the horizontal leaf 76 of a longitudinal extending piano hinge 77 (FIGURES 3, 5 and 6). Supported from the other or vertical leaf 76 of hinge 77 is a sheet metal shutter half 79 shaped as shown in FIGURES 5 and 6. The lower portion of shutter half 79 is inclined inwardly as indicated at 79a.

On the inside face of the opposite side wall of upper housing 54, a like series of screws and nuts (not shown) cooperates in like manner with a like hinge 77 and a like angle 73, seen at the right in FIGURES 5 and 6. In addition to this series of screws and nuts, which is omitted in the interests of clarity, the second of these angles also carries a series of weld nuts 78 for receiving the threaded portions of locking screws 62. As before, the depending hinge leaf carries a shutter half 79 with an inwardly inclined portion 79a similar to that already described. In the idle or closed position of the shutter, the parts are in the position shown in FIGURE 5, being drawn together by a coil spring 80 disposed as shown.

To the inside faces of shutter halves 79 are welded or brazed short metal rods 81 for coaction with an elliptical metal cam 82 rigidly mounted on a suitable shaft 83 supported by a simple bushing 84 in the end wall of upper housing 54 and by a similar but oppositely directed bushing 85 carried by a transversely extending metal web 86, see FIGURES 3, 5 and 6. The latter extends between and is welded, brazed or riveted to the two side walls of upper housing 54. If, with the parts in the position shown in FIGURE 5, shaft 80 is rotated up to 90°, clockwise or counter-clockwise, cam 82 turns by a like amount, thus acting on rods 81 to force shutter halves 79 away from each other. Between the closed position shown in FIGURE 5 and the open position shown in FIGURE 6 is a variety of intermediate positions arrived at by turning shaft 83 through an arc of less than 90°.

Where it projects out of the end wall of upper housing 54, shaft 83 is characterized by an extension 87, a groove (not shown), and, fitting into the grove, a snap ring 88 provided to prevent inward displacement of shaft 83, see FIGURE 3. Mounted on shaft extension 87 is a knurled knob 89 to which is attached a metal disc 90 provided with index marks 91, see FIG. 7. Depending on the position of index marks 91 in relation to an index mark 92 on the proximate end wall of upper housing 54, a person manipulating knob 89 will know whether or not cam 82 is in a position in which shutter halves 79 are separated sufficiently to permit light rays entering through window 55 to impinge on detector assembly 63.

To the end that manipulating knob 89, shaft 83 and cam 82 may be locked in a desired position, the proximate end wall of upper housing 54 is provided with a suitable opening (not shown), an external screw 93 and an internal weld nut 94 tapped to accommodate the inner end of the screw. Nearby, a stud 95 is welded to the outside face of the end wall. Engaging the threaded exterior of screw 93 is a sleeve-like element 96 including a knurled manipulating head 97 and a circular flange 98. By rotating sleeve 96 in the proper direction, flange 98 may be caused to clamp the edge portion of disk 90 between stud 95 and the flange 98 on sleeve 96. By rotating it in the opposite direction, disk 90 may be freed, permitting adjustment of cam 82 by manipulation of knob 89. Thus the amount of light permitted to impinge on detector assembly 63 may be accurately controlled from the exterior of the housing in the interests of optimum operation of the device as a whole.

In the preferred embodiment of the invention, which is shown in the accompanying drawings, elongated light sources and detector elements are used and collimating and condensing lenses are eliminated in favor of simple windows of transparent plastic or glass. These need not be colorless but may be colored, if desired, in order that they may act as filters, particularly with transparent webs. With the elimination of the expensive collimating and condensing lenses used in the past, which are bulky at best, it has become feasible to house all parts of sensor assemblies such as those hereinabove described in small housings that do not take unduly of the space available in the primary installation. Notwithstanding their small size, such housings permit of their use in applications wherein much greater changes in web width can be accepted without adjustment of the position of the sensor assembly or assemblies.

With two sensor assemblies located as shown in FIGURES 1 and 2, it is possible to center web W regardless of whether the portion of the web passing through the web-positioning device at any given time is wider or narrower than the portion that preceded it. So long as the web is centered, no signals will emanate from electrical bridge 24 and there will be no call for a change in the position of piston 9 in the power cylinder 10. If, however, the portion of the web reaching the web-positioning device is off center on either side, the unbalance will be detected, as a result whereof bridge 24 will cause piston 9 to move in a direction such as to bring about prompt centering of the web. If only a single sensor is used, the system may be employed for edge positioning; that is to say, for bringing about alignment of the edge of the web with the edges of those portions of the web that have already passed through the device.

It is evident that numerous changes in what is described in the foregoing specification may be made by those skilled in the art. In lieu of fluorescent electrical tube 47 it is possible to use elongated light sources of other types, including a variety of radiant, gaseous and filament sources. If of adequate intensity, an elongated light source projects light rays uniformly on detector assembly 63 with only the web, which is opaque, and an adjustable shutter intervening to a degree sufficient to reduce the incidence of the rays on the photoconductive element. Within the purview of the invention other changes can be expected to suggest themselves to those skilled in the art.

It is intended that the patent shall cover, by summarization in appended claims, all features of patentable novelty residing in the invention.

What is claimed is:

1. In a photoconductive sensor assembly, the combination comprising an elongated housing; an elongated window in the housing; an elongated lid on the housing; an elongated photoconductive detector assembly on the lid; and, aligned with the window and the photoconductive detector assembly, elongated shutter means supported from the housing in juxtaposition to the photoconductive detector assembly, said shutter means comprising two like shutter halves, a return spring urging them toward each other, and a cam for separating them.

2. A photoconductive sensor assembly according to claim 1 in which the cam is provided with means for manipulating it from the exterior of the housing.

3. A photoconductive sensor assembly according to claim 2 in which the shutter halves are adjustable to a variety of positions between fully closed and fully open positions by the cam manipulating means.

4. A photoconductive sensor assembly according to claim 3 in which means are provided for locking the cam manipulating means in position.

References Cited by the Examiner

UNITED STATES PATENTS

| Re. 25,258 | 10/62 | Asten et al. | 250—239 |
|---|---|---|---|
| 2,117,878 | 5/38 | Friedmann | 250—219 X |
| 2,720,810 | 10/55 | Senn | 250—239 |
| 2,776,357 | 1/57 | Porath | 250—239 |
| 2,779,811 | 1/57 | Picciano et al. | 250—211 X |
| 2,883,559 | 4/59 | Bailey | 250—219 |
| 2,896,508 | 7/59 | Biedermann | 250—237 X |
| 2,972,794 | 2/61 | Saul et al. | 250—12 X |
| 2,981,845 | 4/61 | Larew et al. | 250—219 |
| 3,020,801 | 2/62 | Lander et al. | 250—237 X |
| 2,081,403 | 3/63 | Etzrodt et al. | 250—219 X |
| 3,105,152 | 9/63 | Nash | 250—219 |
| 3,116,673 | 1/64 | Bogopolsky | 250—229 X |

RALPH G. NILSON, *Primary Examiner.*

WALTER STOLWEIN, *Examiner.*